United States Patent

Grögler et al.

[11] Patent Number: 4,882,409
[45] Date of Patent: Nov. 21, 1989

[54] PROCESS FOR THE PRODUCTION OF HEAT-RESISTANT POLYURETHANE UREA ELASTOMERS

[75] Inventors: Gerhard Grögler; Andreas Ruckes; Heinrich Hess, all of Leverkusen, Fed. Rep. of Germany

[73] Assignee: Bayer Aktiengesellschaft, Bayerwerk, Fed. Rep. of Germany

[21] Appl. No.: 245,880

[22] Filed: Sep. 16, 1988

[30] Foreign Application Priority Data

Sep. 29, 1987 [DE] Fed. Rep. of Germany ....... 3732728

[51] Int. Cl.$^4$ ............................................. C08G 18/10
[52] U.S. Cl. ...................................... 528/64; 528/68; 528/76; 528/77; 528/83
[58] Field of Search .................. 528/64, 68, 76, 77, 528/83

[56] References Cited

U.S. PATENT DOCUMENTS 3,004,939 10/1961 Varvaro .................................. 260/22
3,105,062 9/1963 Graham et al. ....................... 260/75
3,891,606 6/1975 Kegon ................................... 260/77.5
3,926,922 12/1975 Baron et al. ......................... 260/77.5

FOREIGN PATENT DOCUMENTS 2635400 2/1978 Fed. Rep. of Germany .
70009195 1/1970 Japan .

Primary Examiner—Maurice J. Welsh
Attorney, Agent, or Firm—Gene Harsh; Joseph C. Gil; Thomas W. Roy

[57] ABSTRACT

The present invention is directed to a process for the production of a polyurethane urea elastomer which comprises preparing a heterogeneous mixture of (a) a diaminodiphenylurea corresponding to the formula

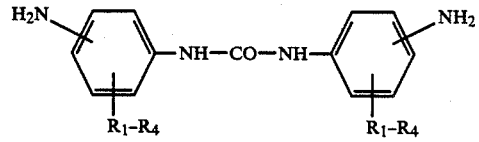

wherein $R_1$, $R_2$, $R_3$ and $R_4$, which may be the same or different, represent hydrogen or a $C_1$–$C_6$ alkyl radical and wherein the amino groups are in the meta and/or para position to the urea group and (b) polyisocyanates and $NH_2$- or OH-groups containing compounds or a NCO-terminated prepolymer prepared from a polyisocyanate and a polyhydroxyl compound having a molecular weight of 400 to about 10,000, and subsequently reacting the heterogeneous system to form a polyurethane urea elastomer by heating the mixture to a temperature below the melting point of said diaminodiphenylurea.

The present invention is also directed to heterogeneous reaction mixtures based on the above diaminodiphenylureas suspended in the above NCO-terminated prepolymers.

18 Claims, No Drawings

PROCESS FOR THE PRODUCTION OF HEAT-RESISTANT POLYURETHANE UREA ELASTOMERS

BACKGROUND OF THE INVENTION

1. Field of the Invention

This invention relates to a technically simplified process for the production of polyurethane urea elastomers in which high-melting aromatic diamines present in solid phase are reacted with polyisocyanates and isocyanate prepolymers respectively in a heterogeneous reaction.

2. Description of the Prior Art

The production of polyurethane urea elastomers from polyisocyanates, relatively high molecular weight polyhydroxyl compounds and aromatic diamines is known. To guarantee reasonable processing times for reactive systems of the starting components mentioned, the most widely used reactive aromatic isocyanates are preferably reacted with sluggishly reacting diamines. The diamines which have been successfully used in practice for this purpose are, above all, aromatic diamines wherein the basicity and, hence, reactivity to isocyanates has been reduced by introduction of halogen or carboxy substituents. 3,3'-dichloro-4,4'-diaminodiphenylmethane (MOCA), previously the most widely used aromatic diamine, is mentioned as an example.

US-PS 3 891 606 describes the crosslinking of NCO prepolymers (prepared from polyhydroxyl compounds and an excess of polyisocyanates) with aromatic diamines whose reactivity to isocyanate groups has been reduced by complexing with certain alkali metal salts. The disadvantage of this process lies in the fact that it is confined to two particular aromatic diamines. In addition, the complex between the aromatic diamine and the alkali metal salt has to be prepared in a separate process step.

Another way of controlling the reaction rate between polyisocyanates and aromatic diamines is to carry out the reaction in an organic solvent. Processes are described, for example, in US-PS 3 926 922 and in published Japanese patent application 9195/70. The disadvantage of using organic solvents is obvious. First, the risk of fire and explosions is increased; second, technically elaborate recovery of the solvent is necessary for both economic and ecological reasons.

Previously, little has been known of the production of polyurethane ureas by reaction of polyisocyanates with aromatic diamines in a heterogeneous phase. According to the prior art, the relatively high-melting aromatic diamines of particular technical interest are either used in dissolved form, which involves the disadvantages described, or are reacted with polyisocyanates in the melt. The processing of aromatic diamines in the melt is described, for example, in the above-cited US-PS 3 926 922 and in DE-AS 1 122 699. DE-AS 1 122 699 relates to a process for the production of polyurethane elastomers by crosslinking liquid isocyanate prepolymers with mixtures of primary diamines and compounds containing several hydroxyl groups in molds. A dispersion of a powder-form crystalline diamine in a liquid polyester or polyether containing several hydroxyl groups or in castor oil is introduced into the prepolymer at a temperature below the melting point of the diamine and the resulting mass is hardened in known manner at temperatures above the melting point of the diamine in the mixture. In this process, therefore, the actual "amine crosslinking" again takes place in a liquid homogeneous phase. The disadvantage of the process according to DE-AS 1 122 699 lies in particular in the high temperatures required for the processing of high-melting diamines such as 1,5-naphthylenediamine (Mp. 189° C.) or 4,4'-diaminodiphenyl ether (Mp. 186° C.) because experience has shown that decomposition reactions occur to a considerable extent in the polyurethane at these temperatures, uncontrollably altering the mechanical properties of the end products.

US-PS 3 105 062 describes a process for the production of polyurethane ureas in which relatively high molecular weight preadducts containing isocyanate groups are preferably reacted with aromatic diamines in a heterogeneous phase. The reaction mixture hardens at a temperature at which the "two-phase system" changes into a "one-phase system." This temperature is generally in the range of 100° to 170° C. However, the aromatic diamines mentioned in US-PS 3 105 062 are soluble, albeit to a limited extent, in the reaction medium (NCO preadduct) so that uncontrollable preliminary reactions occur during the mixing of the two components, even at room temperature. The result is that the reaction mixtures thicken up in a very short time, paste-like formulations being obtained in some cases. Such formulations are difficult to process by the usual casting technique and, accordingly, have to be brought into the required shape by application of pressure before they are actually hardened by the application of heat. It is disclosed in US-PS 3 105 062 that the stability of the thickened reaction mixtures in storage (pot life) is sufficient for further processing (molding under pressure, coating), amounting to several hours. However, it can be seen from the examples that the reaction mixtures in question are preferably reaction mixtures which have a maximum pot life of about 1 hour. Accordingly, they cannot be regarded as long-term systems.

In US-PS 3 105 062, it is specifically pointed out that the use of the diamines mentioned, which are present in solid form only, in a one-shot process gives unsatisfactory polyurethane moldings. In this case, the unwanted preliminary reaction of the diamine with the diisocyanate takes place to a greater extent such that the poorly soluble polyurea precipitates in the reaction mixture and ceases to react.

DE-OS 26 35 400 describes another process for the production of polyurethane urea elastomers, in which aromatic diamines are reacted as chain-extending agents in a one-shot or multistep process. This process is characterized in that the aromatic diamines are present in solid form in the reaction mixtures and have a melting point above 130° C. The thermosetting of these mixtures takes place at a temperature in the range of 80° to 120° C., i.e., below the melting point of the aromatic diamine. By virtue of the choice of the corresponding diamines as chain-extending agents, there is no mixture-thickening preliminary reaction with the NCO preadduct (NCO prepolymer). Accordingly, systems such as these may also be readily processed by casting. Since the pot life of these reactive systems is considerably increased, it is possible in this process to use many aromatic diamines which have always been very difficult to process by previously known techniques.

It can be seen from the examples of DE-OS 26 35 400 that the pot life of the liquid reaction mixtures varies from a few minutes to several hours in a certain temperature range, depending on the reactivity or solubility of the aromatic diamine. Under standard processing conditions, for example in hand casting, these reaction mixtures, particularly when they have relatively long pot lives, can generally be processed without major difficulties. By contrast, processing becomes difficult when, as a result of machine stoppages or other enforced interruptions, there is a relatively long interval between preparation of the reaction mixtures and the hardening phase. Accordingly, the need for a long processing time at low temperature and for a short setting time at elevated temperature is increasingly important in practice.

The final PUR plastics are generally required to show good mechanical properties and, in many cases, a thermal stability adapted to the application envisaged. In the prior art, the thermal stability of PUR elastomers depends largely on the type of chain-extending agent used. When glycolic chain extenders for example are used for the production of elastomers, the PUR moldings obtained show lower thermal stability than when compounds containing amino groups are used. There are of course also distinct differences with regard to thermal stability within the particular type of chain-extending agents, i.e., either compounds containing OH or NH groups.

Many types of diamines are mentioned in DE-OS 26 35 400 as suitable chain extenders for the production of polyurethane urea elastomers. However, 2,2'-diaminodiphenylurea is the only disclosed representative of a diaminodiphenylurea and no example is provided.

Investigation has shown that the reaction of an NCO preadduct with 2,2'-diaminodiphenylurea gives an elastic PUR molding characterized by entirely acceptable mechanical properties. However, the thermal stability of these elastomers is unexpectedly poor. Even when the molding is conditioned at 120° to 130° C., there is a significant reduction in its mechanical properties after only a short time. At 140° to 150° C., only a viscous melt is present, irrespective of whether the sample is hot or cold.

Accordingly, the object of the present invention is to provide a process for the production of polyurethane ureas in which the processing time of the reaction mixtures at the particular processing temperature is at least several hours and preferably at least 8 hours (long pot life). It is also desirable for the liquid reaction mixtures to set in economically acceptable times at low reaction temperatures.

Another object of the invention is to provide suitable chain-extending agents containing amino groups which show only minimal solubility in the starting component (e.g. NCO preadduct) at low temperature, but very good solubility therein at elevated temperature, so that the polyurethane urea is synthesized with as high a molecular weight as possible during the hardening phase of the mixtures.

A further object of the present invention is to provide a process for the production of polyurethane urea elastomers in which high-quality elastomers of high heat resistance are obtained.

It has now been found that these objectives may be achieved in accordance with the present invention.

SUMMARY OF THE INVENTION

The present invention is directed to a process for the production of a polyurethane urea elastomer which comprises preparing a heterogeneous mixture of (a) a diaminodiphenylurea corresponding to the formula

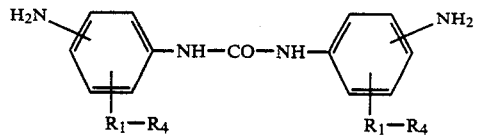

wherein $R_1$, $R_2$, $R_3$ and $R_4$, which may be the same or different, represent hydrogen or a $C_1$–$C_6$ alkyl radical and wherein the amino groups are in the meta and/or para position to the urea group and (b) a polyisocyanate or a NCO-terminated prepolymer prepared from a polyisocyanate and a polyhydroxyl compound having a molecular weight of 400 to about 10,000, and subsequently reacting the heterogeneous system to form a polyurethane urea elastomer by heating the mixture to a temperature below the melting point of said diaminodiphenylurea.

The present invention is also directed to heterogeneous reaction mixtures based on the above diaminodiphenylureas suspended in the above polyisocyanates or NCO-terminated prepolymers.

DETAILED DESCRIPTION OF THE INVENTION

These systems may be hardened at any time by the application of heat (120° to 180° C.). Polyurethane elastomers characterized by very good mechanical properties and high heat resistance are obtained.

If, by contrast, the chain-extending agents according to the invention are added in dissolved form to the polyisocyanates or NCO preadducts, they behave in the same way as other aromatic diamines, i.e., the reaction mixture crosslinks after a few seconds and the resulting gel-like product is no longer processible.

Accordingly, the reactivity of the diaminodiphenylureas present in heterogeneous phase to the NCO groups of the polyisocyanates or of the relatively high molecular weight preadducts is of only minor importance to the long pot life of the reaction mixtures according to the invention. Instead, the crosslinking velocity is largely determined by the tendency of the diamines to dissolve in the reaction mixture. As a result, the stability of the reaction mixtures in storage is also dependent to a very large extent upon the type of polyol on which the starting material, e.g. the NCO preadduct is based. By using suitable polyols, it is also possible to influence the crosslinking time or rather the crosslinking temperature of the mixtures as required.

When commercially available polypropylene glycol ethers (of propylene oxide+$H_2O$) for example are used for the preparation of the NCO preadducts, one-component systems storable at room temperature are obtained in admixture with suitable diaminodiphenylureas. However, mixtures such as these only set after prolonged application of heat at the predetermined temperatures. Uncontrollable secondary reactions involving the NCO preadduct (for example trimerization, allophanatization) can occur in the meantime, so that unsatisfactory elastomers are obtained.

However, this long setting time can be considerably shortened, for example, by using propylene glycol ethers additionally containing ethylene oxide units as starting components. The character of the one-component system is not affected.

On the other hand, the use of pure polypropylene glycol ether is advisable when the chain extender containing NH$_2$ groups shows slightly better solubility than described in the above cases.

This also applies where polyesters, for example polyadipate, are used for the preparation of the NCO preadduct. In this case, the processing characteristics of the mixtures may be significantly influenced by the choice of the low molecular weight glycols (esterification components).

Under no circumstances, however, should preliminary thickening occur through premature polyaddition of the reaction mixtures when the two reaction components (NCO preadduct and aromatic diamine) are mixed at room temperature or moderately elevated temperature.

The diaminodiphenylureas suitable for the purposes of the invention are prepared by methods known per se. For example, nitroanilines may be converted into the corresponding dinitrodiphenylureas by reaction with phosgene or diphenylcarbonate and subsequently converted into the desired diaminodiphenylureas by reduction. Another generally applicable method is the reaction of aminoacetanilides with phosgene or diphenylcarbonate with subsequent alkaline hydrolysis of the acetamide group to the desired product.

One method which is particularly simple and therefore preferred for the preparation of the ureas according to the invention comprises reacting p- or m-diamines with urea, as described in US-PS 1 617 847 (in an inert solvent or in the melt) or in US-PS 2 503 797 (in sulfuric acid or neutral aqueous solution).

Due to the production method, however, relatively high molecular weight polynuclear products corresponding to the following general formula

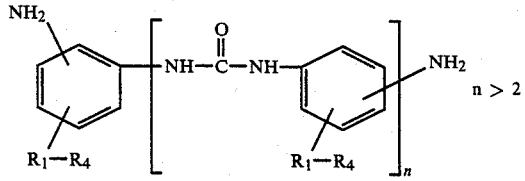

are generally formed in addition to the monomeric diaminodiphenylureas, although they do not have any adverse effect on the properties of the elastomers within certain limits. However, the proportion of ureas in which n=1 to 3 should be at least 60% by weight, based on the total quantity. However, ureas containing as high a proportion of "monomers" (n=1) as possible are preferred.

The diaminodiphenylureas which accumulate in solid form are generally first finely ground, for example in a ball mill, to an average particle size of about 1 to 50 μm, and preferably about 3 to 10 μm.

Examples of preferred diamines for the preparation of the ureas according to the invention include p-phenylenediamine, m-phenylenediamine, 2,5-diaminotoluene, 2,4-diaminotoluene, 2,6-diaminotoluene, 1-methyl-3,5-diethyl-2,6-diaminobenzene and 1,3,5-triethyl-2,4-diaminobenzene. The diamine powders obtained may be directly mixed with the NCO preadduct. Alternatively, they may advantageously be mixed in the form of a suspension containing a little of the high molecular weight polyol on which the NCO preadduct is based.

It is of course also possible to use mixtures of the above-mentioned diaminodiphenylureas and other chain-extending agents known in PUR chemistry containing at least two isocyanate-reactive hydrogen atoms and having a molecular weight of 60 to less than 400.

In the process according to the invention for the production of heat-stable polyurethane ureas, the above-mentioned solid diaminodiphenylureas according to DE-OS 3 429 149 may also be used in retarded form. Thus, the diaminodiphenylureas may be treated with small quantities of a suitable polyisocyanate, i.e., about 0.05 to 20 NH$_2$ equivalents of chain extender were prereacted with polyisocyanate, before they are used as chain extenders, for example in an inert solvent or preferably in suspension in a high molecular weight polyol. As a result of this treatment, a thin polyurea skin acting as an anti-diffusion layer is formed on the particle surface of the diamine. This anti-diffusion layer is destroyed at a certain temperature or even by surface dissolution to initiate the hardening of the mixture.

The diaminodiphenylureas (either in powder form or in the form of a suspension in polyol) modified (retarded) in this way, in combination with NCO preadducts, give reactive systems which have distinctly longer stability in storage than systems in which the chain extender was not provided with an anti-diffusion layer.

As starting components in the process according to the invention polyisocyanates together with NCO reactive compounds (e.g. OH— or NH$_2$-groups containing compounds) and the NCO preadducts thereof may be used.

The polyhydroxyl compounds suitable for use in the process according to the invention for production of the NCO preadducts have a molecular weight of 400 of about 10,000, preferably about 600 to 6,000. Suitable polyhydroxyl compounds include polyesters, polyethers, polythioethers, polyacetals, polycarbonates and polyester amides containing at least two, preferably two to four hydroxyl groups of the type known per se for the production of homogeneous and cellular polyurethanes.

The polyesters containing hydroxyl groups which may be used in the process according to the invention include reaction products of polyhydric, preferably dihydric alcohols (optionally in admixture with trihydric alcohols) with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for the production of the polyesters. The polycarboxylic acids may be aliphatic, cycloaliphatic, aromatic and/or heterocyclic and may be optionally substituted, for example by halogen atoms, and/or unsaturated. Examples of such polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids (such as oleic acid, optionally in admixture with monomeric fatty acids), terephthalic acid dimethyl ester and terephthalic acid bisglycol ester. Suitable polyhydric alcohols include ethylene glycol, 1,2- and 1,3-propylene glycol, 1,4-, 1,3- and 2,3-butylene glycol, hexane-1,6-diol, octane-1,8-diol, neopentyl glycol, cyclohexane dimethanol (1,4-bis-hydroxymethylcyclohexane), 2-methyl-1,3-propanediol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycol, dipropylene glycol, polypropylene glycols, dibutylene glycol and polybutylene glycols. The polyesters may contain terminal carboxyl groups. Polyesters of lactones (for example ε-caprolactone) or hydroxycarboxylic acids (for example ω-hydroxycaproic acid) may also be used.

The polyethers containing at least two, generally two to eight and preferably two to three hydroxyl groups which may be used in accordance with the invention are also known per se and are obtained, for example, by the polymerization of epoxides such as ethylene oxide, propylene oxide, butylene oxide, tetrahydrofuran, styrene oxide or epichlorohydrin, on their own, for example in the presence of $BF_3$, or by an addition of these epoxides, optionally in admixture or successively, onto starter components containing reactive hydrogen atoms such as water, alcohols or amines. Examples include ethylene glycol, 1,3- or 1,2-propylene glycol, trimethylolpropane, 4,4'-dihydroxydiphenylpropane, aniline, ammonia, ethanolamine or ethylenediamine. Sucrose polyethers of the type described, for examle, in DE-AS 1 176 358 and 1 064 938 may also be used in accordance with the invention. In many cases, it is preferred to use polyethers predominantly containing OH groups (up to 90% by weight, based on all the OH groups present in the polyether). Polyethers modified by vinyl polymers, of the type obtained, for example, by the polymerization of styrene and acrylonitrile in the presence of polyethers (US-PS 3 383 351, 3 304 273, 3 523 093 and 3 110 695 and DE-PS 1 152 536) are also suitable, as are polybutadienes containing OH groups.

Suitable polythioethers include condensates of thiodiglycol on its own and/or with other glycols, dicarboxylic acids, formaldehyde, aminocarboxylic acids or aminoalcohols. Depending on the co-reactants, the products may be polythio mixed ethers, polythioether esters or polythioether ester amides.

Suitable polyacetals include the compounds obtainable from glycols (such as diethylene glycol, triethylene glycol, 4,4'-dioxethoxydiphenyl dimethylmethane and hexanediol) and formaldehyde. Polyacetals suitable for use in accordance with the invention may also be obtained by the polymerization of cyclic acetals.

Suitable polycarbonates containing hydroxyl groups are those which may be obtained, for example, by the reaction of diols (such as propane-1,3-diol, butane-1,4-diol, hexane-1,6-diol, diethylene glycol, triethylene glycol or tetraethylene glycol) with phosgene or diarylcarbonates such as diphenylcarbonate.

The polyester amides and polyamides include the predominantly linear condensates obtained from polybasic, saturated and unsaturated carboxylic acids or their anhydrides and polyfunctional, saturated and unsaturated aminoalcohols, diamines, polyamines and mixtures thereof.

Polyhydroxyl compounds already containing urethane or urea groups and optionally modified natural polyols (such as castor oil, carbohydrates or starch) may also be used. Addition products of alkylene oxides with phenolformaldehyde resins or with urea-formaldehyde resins may also be used in the process according to the invention.

Representatives of these compounds suitable for use in accordance with the invention are described, for example, in High Polymers, Vol. XVI, "Polyurethanes, Chemistry and Technology", edited by Saunders-Frisch, Interscience Publishers, New York/London, Vol. I, 1962, pages 32–42 and pages 44–54 and Vol. II, 1964, pages 5–6 and 198–199, and in Kunststoff-Handbuch, Vol. VII, Vieweg-Höchtlen, Carl-Hanser-Verlag, München, 1966, for example on pages 45 to 71.

It is of course possible to use mixtures of the above-mentioned compounds containing at least two isocyanate-reactive hydrogen atoms and having a molecular weight of 400 to about 10,000, for example, mixtures of polyethers and polyesters.

Other starting components which may be used in accordance with the invention are aliphatic, cycloaliphatic, araliphatic, aromatic and heterocyclic polyisocyanates of the type described, for example, by W. Siefken in Justus Liebigs Annalen der Chemie, 562, pages 75 to 136. Examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanate-3,3,5-trimethyl-5-isocyanatomethyl cyclohexane (DAS 1 202 785), 2,4- and 2,6-hexahydrotoluylene diisocyanate and mixtures of these isomers, hexahydro-1,3- and/or -1,4-phenylene diisocyanate, perhydro-2,4'- and/or -4,4'-diphenyl methane diisocyanate, 1,3- and 1,4-phenylene diisocyanate, 2,4- and 2,6-toluylene diisocyanate and mixtures of these isomers, diphenylmethane-2,4'- and/or -4,4'-diisocyanate, naphthylene-1,5-diisocyanate, triphenylmethane-4,4',4''-tri-isocyanate, polyphenyl polymethylene polyisocyanates of the type obtained by phosgenation of aniline-formaldehyde condensates and described, for example, in GB-PS 874 430 and 848 671, perchlorinated aryl polyisocyanates of the type described, for example, in DE-AS 1 157 601, polyisocyanates containing carbodiimide groups of the type described in DE-PS No. 1 092 007, diisocyanates of the type described in U.S. Pat. No. 3,492,330, polyisocyanates containing allophanate groups of the type described in GB-PS No. 994 890, BE-PS No. 761 626 and in published Dutch patent application No. 7 102 524, polyisocyanates containing isocyanate groups of the type described in DE-PS Nos. 1 022 789, 1 222 067 and 1 027 394 and in DE-OS Nos. 1 929 034 and 2 004 048, polyisocyanates containing urethane groups of the type described in BE-PS No. 752 261 or U.S. Pat. No. 3,394,164, polyisocyanates containing acylated urea groups according to DE-PS No. 1 230 778, polyisocyanates containing biuret groups of the type described in DE-PS No. 1 101 394, GP-PS No. 889 050 and FR-PS No. 7 017 514, polyisocyanates produced by telomerization reactions of the type described in BE-PS No. 723 640, polyisocyanates containing ester groups of the type described in GB-PS No. 965 474 and 1 072 956, U.S. Pat. No. 3,567,763 and DE-PS No. 1 231 688 and also reaction products of the above-mentioned isocyanates with acetals according to DE-PS No. 1 072 385.

It is also possible to use the distillation residues containing isocyanate groups obtained in the commercial production of isocyanates, optionally in solution in one or more of the above-mentioned polyisocyanates. Mixtures of these polyisocyanates may also be used. In general, it is particularly preferred to use the commercially available polyisocyanates such as 2,4- and 2,6-toluylene diisocyanate and mixtures of these isomers ("TDI"), polyphenyl polymethylene polyisocyanates of the type obtained by phosgenation of aniline-formaldehyde condensates ("crude MDI") and polyisocyanates containing carbodiimide groups, urethane groups, allophanate groups, isocyanurate groups, urea groups or biuret groups ("modified polyisocyanates").

The polyisocyanates or rather the isocyanate prepolymers prepared from the above-mentioned polyisocyanates and the above-mentioned relatively high molecular weight and/or low molecular weight polyols should be present in liquid form during the reaction with the powder-form or suspended aromatic diamine.

Where polyurethane foams are to be produced by the process according to the invention, water and/or readily volatile organic compounds are used as blowing agents. Suitable organic blowing agents include acetone, ethylacetate, methanol, ethanol, halogen-substituted alkanes (such as methylene chloride, chloroform, ethylidene chloride, vinylidene chloride, monofluorotrichloromethane, chlorodifluoromethane and dichlorodifluoromethane) butane, hexane, heptane or diethyl ether. The blowing effect may also be obtained by addition of compounds which decompose at elevated temperatures with the elimination of gases such as nitrogen, for example, azo compounds such as azoisobutyronitrile. Further examples of blowing agents and information on the use of blowing agents can be found in Kunststoff-Handbuch, Vol. VII, published by Vieweg and Höchtlen, Carl-Hanser-Verlag, München 1966, for example on pages 108, 109, 453, 455 and 507 to 510.

According to the invention catalysts may also be used. Suitable catalysts are known and include tertiary amines such as triethylamine, tributylamine, N-methylmorpholine, N-ethylmorpholine, N,N,N',N'-tetramethyl ethylenediamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyl diethylenetriamine, N,N-dimethylcyclohexylamine, N,N,N',N'-tetramethyl-1,3-butanediamine, N,N-dimethyl-$\beta$-phenylethylamine, 1,2-dimethyl imidazole and 2-methyl imidazole.

Tertiary amines containing isocyanate-reactive hydrogen atoms include triethanolamine, triisopropanolamine, N-methyl diethanolamine, N-ethyl diethanolamine, N,N-diethyl ethanolamine, reaction products thereof with alkylene oxides such as propylene oxide and/or ethylene oxide.

Other suitable catalysts include silaamines containing carbon-silicon bonds of the type described, for example, in DE-PS No. 1 299 290 such as 2,2,4-trimethyl-2-silamorpholine and 1,3-diethylamino methyl tetramethyl disiloxane.

Other suitable catalysts include nitrogen-containing bases such as tetraalkyl ammonium hydroxides, alkali hydroxides such as sodium hydroxide, alkali phenolates such as sodium phenolate, or alkali alcoholates such as sodium methylate. Hexahydrotriazines may also be used as catalysts.

According to the invention, organometallic compounds, especially organotin compounds, may also be used as catalysts. Preferred organotin compounds include tin(II) salts of carboxylic acids such as tin(II) acetate, tin(II) octoate, tin(II) ethyl hexoate and tin(II) laurate, and the dialkyl tin salts of carboxylic acids such as dibutyltin diacetate, dibutyltin dilaurate, dibutyltin maleate or dioctyltin diacetate.

Further representatives of catalysts suitable for use in accordance with the invention and information on the way in which the catalysts function can be found in Kunststoff-Handbuch, Vol. VII, published by Vieweg and Höchtlen, Carl-Hanser-Verlag, München 1966, for example on pages 96 to 102.

The catalysts are generally used in a quantity of about 0.001 to 10% by weight, based on the quantity of polyhydroxyl compounds having a molecular weight of 400 to about 10,000.

According to the invention, it is also possible to use surface-active additives (emulsifiers and foam stabilizers). Suitable emulsifiers include the sodium salts of castor oil sulfonates or fatty acids or salts of fatty acids with amines such as diethylamine oleate or diethanolamine stearate. Alkali or ammonium salts of sulfonic acids (such as dodecyl benzene-sulfonic acid or dinaphthylmethane disulfonic acid), fatty acids (such as ricinoleic acid) or polymeric fatty acids may also be used as surface-active additives.

Known foam stabilizers may be used preferably water-soluble polyether siloxanes. The structure of these compounds is generally such that a copolymer of ethylene oxide and porpylene oxide is attached to a polydimethylsiloxane residue. Foam stabilizers such as these are described, for example, in U.S. Pat. No. 2,764,565.

According to the invention, it is also possible to use reaction retarders, for example, acid-reacting compounds such as hydrochloric acid or organic acid halides; cell regulators such as paraffins, fatty alcohols or dimethyl polysiloxanes; pigments or dyes; flame-retardant agent such as trischloroethylphosphate or ammonium phosphate or polyphosphate; stabilizers against the effects of aging and weather; plasticizers; fungistatic and bacteriostatic agents; and fillers such as barium sulfate, dieselguhr, carbon black or whiting.

Further examples of surface-active additives and foam stabilizers, cell regulators, reaction retarders, stabilizers, flameproofing agents, plasticizers, dyes, fillers, fungistatic and bacteriostatic agents, which may optionally be used in accordance with the invention, and information on the use of such additives and the way in which they function can be found in Kunststoff-Handbuch, Vol. VI, published by Vieweg and Höchtlen, Carl-Hanser-Verlag, München 1966, for example on pages 103 to 113.

According to the invention, the reaction components may be reacted by the prepolymer process or the semiprepolymer process, often using machines, for example of the type described in U.S. Pat. No. 2,764,565. Information on processing machines which may be used in accordance with the invention can be found in Kunststoff-Handbuch, Vol. XVI, published by Vieweg and Höchtlen, Carl-Hanser-Verlag, München 1966, for example on pages 121 to 205.

In the process according to the invention, the quantities of reaction components are selected so that the equivalent ratio of isocyanate groups to isocyanate-reactive groups present in the chain extender and the high molecular weight compounds containing OH groups is generally between about 0.7 to 1.5, preferably between about 0.9 and 1.15, depending on the particular processing technique applied. The NCO content of the prepolymer, when the prepolymer process is used, is about 1.8 to 6% by weight. The equivalent ratio of isocyanate-reactive groups in the chain extender to reactive OH groups in the high molecular weight compound may vary within wide limits and should preferably be between about 0.4 and 1.5, in which case flexible to rigid polyurethanes are obtained. In addition to the diamines to be used in accordance with the invention, other diamines or even diols, for example those mentioned above with regard to the preparation of the polyhydroxyl compounds, may also be used as chain extenders. However, the mole fraction of the amine according to the invention in the chain extender should be between about 0.5 and 1, preferably between about 0.8 and 1 and most preferably 1.

The process according to the invention may be carried out also in a two-step process. The polyol component containing at least two hydroxyl groups and having a molecular weight of 400 to about 10,000 is reacted in known manner with an excess of diisocyante to form an NCO preadduct. The course of the reaction may be monitored by NCO titration. On completion of the polyaddition reaction, the diaminodiphenylurea is introduced in the form of a solid powder (particle size about 5 to 50 μm) using a suitable stirrer and the suspension formed is thoroughly mixed.

However, it is also possible initially to mix the solid diamine powder in a little of the high molecular weight liquid polyol on which the NCO preadduct is based. The weight ratio of diaminodiphenylurea to polyol in the suspension is about 1.0:0.5 to 1.0:5.0, preferably about 1.0:1.0 to 1.0:2.0. The paste or castable suspension thus obtained may then be added to the NCO preadduct. The advantage of this process is that it is easy to carry out.

The temperature at which the chain extender is added depends on the state of the NCO preadduct. With liquid NCO preadducts, the chain extender (as such or preferably in suspension in a polyol) is added at room temperature. With highly viscous or solid NCO prepolymers, the chain extender is added at the temperaure at which satisfactory casting of the mixtures is guaranteed. This temperature should not exceed 60° to 80° C. Under no circumstances, however, should there be any preliminary reaction of the NCO prepolymers and the aromatic diamine because any uncontrollable increase in the viscosity of the mixture complicates further processing by the normal casting technique. A short time after addition of the diamine, the reaction mixture is degassed in vacuo.

The processing time (pot life) of the systems depends upon the type of diaminodiphenylurea and the NCO preadduct. The processing temperature should not of course be too high because preliminary reactions may occur.

The processing of the reactive systems according to the invention depends upon their state. Liquid systems castable at room temperature may be processed by casting, optionally being briefly heated before casting, for example to 50°-70° C. Systems which can no longer be cast, but which still flow can be applied to any desired substrates, for example using a coating knife, and then hardened by heat. Plastic systems (pastes) may be processed under pressure in molds, with periods of 5 to 15 minutes at 120° C. being sufficient for hardening.

Solid systems, particularly based on relatively high melting starting polyols (45° to 65° C.), are processed either under pressure in molds (injection molding) or, for example, at or above the melting temperature of the polyol. Systems prepared beforehand may be introduced in the form of solid granulates into a mold heated above the melting point of the polyol (generally below 70° C.). Thereafter, the mold is heated to 100°-120° C. and the contents hardened.

The hardening temperature of the reactive systems according to the invention is about 100° to 180° C. The hardening time decreases with increasing hardening temperature. The heating time may be less than 1 minute or several hours, depending on the temperature. In some cases, it is of advantage to condition the plastics for a while at 100° C. after removal from the molds to guarantee complete hardening.

Elastomers produced in accordance with the invention may be used for a variety of applications, for example, for moldings subjected to severe mechanical stressing such as tires, rollers, V-belts, seals subjected to severe thermal or chemical stressing, hot water pipes or motors or for the production of films, textile coatings and polyurethane powders.

The chain-extending reaction may also be carried out in the presence of the above-described blowing agents and additives, preferably in closed molds, in which case foams having a cellular core and a compact skin may be formed.

The elastic and semi-elastic foams obtainable by the process according to the invention may be used as upholstery materials, mattresses, packaging materials and, by virtue of their flame resistance, for applications where these properties are particularly important such as in automobile and aircraft construction and transportation in general. The foams may be produced either by in-mold foaming or may be fabricated from block-foamed material.

The process according to the invention is illustrated by the following examples in which all references are to parts by weight or percentages by weight unless otherwise indicated.

EXAMPLES

EXAMPLE 1

An NCO preadduct having an NCO content of 3.6 to 3.8% was obtained by the reaction of a linear polyester of adipic acid and ethylene glycol (OH number 56, molecular weight 2,000) with 2,4-diisocyanatotoluene (TDI) (equivalent ratio 1:2) at 60° to 80° C.

200 g of this NCO component were thoroughly mixed at 40° to 50° C. with 23.2 g 4,4'-diaminodiphenylurea prepared in accordance with U.S. Pat. No. 2,503,797 from p-phenylenediamine and urea in water. The solid 4,4-diaminodiphenylurea had a particle diameter of 10 to 40 μm. The suspension was thoroughly degassed by a water jet vacuum.

The reactive system thus obtained was stable in storage for at least 1 week at a temperature of 40° to 50° C. There was no preliminary reaction leading to a considerable increase in the viscosity of the mixture.

The liquid reactive system was poured into a preheated mold coated with release agents which was then heated to 140° to 150° C.

After 1 to 2 hours, the mixture hardened and the molding was removed from the mold. It was further conditioned for another 4 hours at that temperature.

A highly elastic PUR elastomer having the following mechanical properties was obtained:

| | | |
|---|---|---|
| Modulus (100%) | (MPa) | 12.5 |
| Tensile strength | (MPa) | 31 |

| | | |
|---|---|---|
| Elongation at break | (%) | 600 |
| Tear propagation resistance | (KN/m) | 105 |
| Elasticity | (%) | 38 |
| Hardness | (Shore A) | 95 |

The elastomer had high heat resistance under load.

EXAMPLE 2

An NCO-terminated preadduct having an NCO content of 3.5% was prepared at 70° to 80° C. from a linear polypropylene glycol ether (OH number 56, molecular weight 2,000) and 2,4-diisocyanatotoluene equivalent ratio 1:2). 200 g of the liquid preadduct were mixed with 21.4 g 4,4'-diaminodiphenylurea and the suspension was degassed in a water jet vacuum after 15 to 30 minutes. A one-component system which was stable in storage at room temperature and moderately elevated temperature, was obtained. Only after 2 to 3 months did a gradual increase in viscosity occur.

The reaction mixture had a hardening time at 140° to 150° C. of about 5 to 6 hours. The PUR elastomer formed had the following mechanical properties:

| | | |
|---|---|---|
| Modulus (100%) | (MPa) | 10 |
| Tensile strength | (MPa) | 15 |
| Elongation at break | (%) | 550 |
| Tear propagation resistance | (KN/m) | 35 |
| Elasticity | (%) | 40 |
| Hardness | Shore A | 90 |

The elastomer had high heat resistance under load and could be heated for several hours at 170° C. without any visible effects.

EXAMPLE 2a (Comparison)

200 g of the NCO preadduct of polypropylene glycol ether and TDI prepared in Example 2 (NCO content 3.5%) were mixed while stirring with 20.84 g 2,2'-diaminodiphenylurea in the form of a fine powder. This reaction mixture was stable in storage for several hours at room temperature.

The polyurethane urea elastomer prepared in accordance with Example 1 had a hardening time of 1.5 hours at 120° C. and had the following mechanical properties:

| | | |
|---|---|---|
| Modulus | (MPa) | 6.5 |
| Tensile strength | (MPa) | 10.3 |
| Elongation at break | (%) | 400 |
| Tear propagation resistance | (KN/m) | 25 |
| Elasticity | (%) | 40 |
| Hardness | Shore A | 85 |

The elastomer had a reduced, but entirely acceptable property spectrum; however, it was unexpectedly poor in a heat test.

After storage times (ripening time) of
1. 2 hours
2. 1 day
3. 3 days at room temperature, the test specimens were heated to 140°-150° C. in a heating cabinet. Whereas the specimens obtained by the process according to the invention and based on 3,3'- and 4,4'-diaminodiphenylurea withstood this heat test without any visible effects, the polyurethane urea elastomer prepared with 2,2'-diaminodiphenylurea had a totally unexpected result. Even after only brief application of heat, the test specimen lost its dimensional stability and a liquid melt was obtained. Even in the cold state, this molten product did not show any elastic character. The originally highly elastic molding was destroyed.

EXAMPLE 3

When the linear polypropylene glycol ether mentioned in Example 2 (polymerization of propylene oxide; 100% PO units) was replaced with a linear polypropylene glycol ether containing 75% propylene oxide and 25% ethylene oxide units (chain ends), an NCO preadduct having an NCO content of 3.5% was obtained using TDI.

21.4 g 4,4'-diaminodiphenylurea were added with stirring to 200 g of this NCO prepolymer, followed by degassing for 15 to 30 minutes. The suspension, which was liquid at room temperature, was also stable in storage. However, the hardening time of this system was considerably shorter than that of the system described in Example 2. A high-quality polyurethane urea elastomer having the following properties was obtained after only about 30 minutes at 140° to 150° C.:

| | | |
|---|---|---|
| Modulus (100%) | (MPa) | 10.2 |
| Tensile strength | (MPa) | 14.5 |
| Elongation at break | (%) | 550 |
| Tear propagation resistance | (KN/m) | 34 |
| Elasticity | (%) | 38 |
| Hardness | Shore A | 91 |

EXAMPLE 4

200 g of the NCO preadduct of polypropylene glycol ether and TDI prepared in Example 2 (NCO content 3.5%) were mixed with 30 g 3,3'-diamino-4,4'-dimethyldiphenylurea (prepared in accordance with DE-A 36 13 249 by the alkaline hydrolysis of 3,3'-diisocyanato-4,4'-dimethyldiphenylurea).

To determine the stability in storage at room temperature, the viscosity of the liquid reaction mixture was determined over several days. The following viscosity trend was observed:

| | Viscosity/RT | |
|---|---|---|
| 1st day (production) | 25,500 cP/RT | |
| 2nd day | 28,000 | |
| 3rd day | 28,500 | substantially |
| 4th day | 29,300 | stable in storage |
| 6th day | 32,800 | |
| 8th day | 58,000 | |

According to these figures, the reaction mixture was stable in storage for about 4 days.

The liquid NCO preadduct/diaminodiphenylurea suspension was hardened by the application of heat at a temperature of only 120° C. After application of heat for about 1 to 2 hours, followed by conditioning of the PUR moldings (3 to 4 hours at 120° C.), the end products obtained had the following mechanical properties:

| | | |
|---|---|---|
| Modulus (100%) | (MPa) | 12.5 |
| Tensile strength | (MPa) | 14.5 |
| Elongation at break | (%) | 400 |

| Tear propagation resistance | (KN/m) | 30.5 |
| Elasticity | (%) | 40 |
| Hardness | Shore A | 91 |

EXAMPLE 5

In order to retard (deactivate) solid diamines with aliphatic polyisocyanates as set forth in DE-A 3 429 149, 100 g 3,3'-diamino-4,4'-dimethyldiphenylurea in powder form were suspended in 500 ml ligroin. 15 g of a solution of 7.5 g of the isocyanurate of 1,6-diisocyanatohexane (NCO=24.5%) in 7.5 g toluene were then added with vigorous stirring. After stirring for 3 to 4 hours at room temperature, the reaction mixture was heated for about 2 hours at 60° to 70° C. The diaminodiphenylurea thus modified was filtered off under suction and freed from residual ligroin by drying.

30 g of the retarded diamine were mixed with 200 g of the NCO preadduct (NCO=3.5%) prepared in Example 2. The suspension obtained did not show any significant increase in viscosity after prolonged storage (2 weeks) at room temperature. The system was hardened in 1 to 2 hours at a temperature of 120° C. The mechanical properties of the elastomers obtained were comparable with those shown in Example 4.

EXAMPLE 6

1. 60 g of a linear polypropylene glycol ether (molecular weight 2,000, OH number 56) were thoroughly mixed with 30 g of finely powdered 3,3'-diamino-4,4'-dimethyldiphenylurea (NH value 290). Due to its production process (alkaline hydrolysis of 3,3'-diisocyanato-4,4'-dimethyldiphenylurea), the chain extender contained components of relatively high molecular weight (oligomers). A suspension (A) which was still castable at room temperature was obtained.

This mixture A was added at room temperature to 163 g of an NCO preadduct of a linear polypropylene glycol ether having a molecular weight of 1000 and TDI (NCO content 5.7%). The reactive system formed remained processible for a long period because the viscosity buildup of the system took place very slowly. After a period of about 15 hours, the increase in viscosity was so great that processing by casting could no longer be possible.

2. 1.5 g of the isocyanurate of 1,6-diisocyanatohexane (NCO content 23%) were added to suspension A (diaminodiphenylurea/polyether suspension). The resulting mixture was then heated for 3 to 4 hours at 80° C. Thereafter no NCO band could be detected in the IR spectrum. The suspension thus modified was mixed with 163 g of the above-mentioned preadduct (NCO content 5.7%). The OH groups of the polypropylene glycol ether (suspension component for the solid diamine) reacted slowly with the NCO preadduct. Processing was not affected. After about 24 hours, the NCO/OH reaction was over and the reactive system obtained had a viscosity of 10,000 to 12,000 cP/RT.

This system remained stable in storage for several weeks.

The polyurethane urea elastomer obtained by thermosetting at 120° to 130° C. had the following mechanical properties:

| Modulus (100%) | (MPa) | 7.5 |
| Tensile strength | (MPa) | 12.6 |
| Elongation at break | (%) | 550 |
| Tear propagation resistance | (KN/m) | 35 |
| Elasticity | (%) | 45 |
| Hardness | Shore A | 86 |

EXAMPLE 7

200 g of the NCO preadduct of polyester diol and TDI prepared in Example 1 (NCO content 3.6 to 3.8%) were mixed with 32.6 g of 3,3'-diamino-4,4'-dimethyldiphenylurea at a temperature of 40° to 50° C. (melt). The suspension formed showed a stability in storage at that temperature of about 1 to 2 hours. At 120° C., the reaction mixture set in only 2 to 5 minutes. High-quality PUR moldings having the following mechanical properties were obtained by casting in according with Example 1:

| Modulus (100%) | (MPa) | 10.0 |
| Tensile strength | (MPa) | 25 |
| Elongation at break | (%) | 500 |
| Tear propagation resistance | (KN/m) | 72 |
| Elasticity | (%) | 38 |
| Hardness | Shore A | 93 |

EXAMPLE 8

1,000 g (1.0 mole) of a linear polypropylene glycol ether (MW 1,000, OH number 112) were mixed with 672 g (4.0 moles) 1,6-diisocyanatohexane. After heating for 6 to 8 hours at 80° C., the excess diisocyanate was removed from the reaction mixture using a thin-layer evaporator. The NCO preadduct, which was monomer-free, had an NCO content of 5.9%.

50.4 g 3,3'-diamino-4,4'-dimethyldiphenylurea were added to 200 g of the NCO preadduct and the resulting suspension thoroughly homogenized at room temperature using a suitable stirrer. The suspension thus homogenized was then degassed in a water jet vacuum. The reaction mixture thus obtained remained castable for at least 2 days. There was no excessive increase in viscosity.

The PUR elastomer obtained in accordance with Example 1 (hardening conditions 2 hours at 150° C.) had the following mechanical properties:

| Modulus (100%) | (MPa) | 11.1 |
| Tensile strength | (MPa) | 18.5 |
| Elongation at break | (%) | 350 |
| Tear propagation resistance | (KN/m) | 45 |
| Elasticity | (%) | 48 |
| Hardness | Shore A/D | 95/50 |

EXAMPLE 9

(One-step process)

20 g of a solution of 10 g of trimeric 1,6-diisocyanatohexane (isocyanurate, NCO=24.5%) in 10 g of toluene are added to a suspension of 200 g of 3,3'-diamino-4,4'-dimethyldiphenylurea in 400 g of a linear polypropylene glycol ether (molecular weight: 2000, OH number: 56). The reaction mixture is kept at 80° to 100° C. for 4–5 hours with stirring. Then the toluene which had been added (10 g) is removed in vacuo. The diaminodiphenylurea suspended in polypropylene glycol ether is thus obtained in a deactivated form (DE-A 34 29 149).

160 g of this suspension are mixed with 200 g of a linear polypropylene glycol ether (molecular weight: 1000, OH number: 112). Then 111 g of a melt of 4,4'-diisocyanatodiphenylmethane (NCO=33.5%, temperature 40°–50° C.) are added. After degasification under a water jet vacuum the mixture is poured into a mould provided with release agents. The processing time of the reaction mixture is 3 to 4 hours. Hardening then takes place under heat. After about 3 hours at 130° to 150° C. a highly elastic tough polyurethaneurea moulding with a hardness of 88 A is obtained.

COMPARATIVE EXAMPLE

If the above reaction procedure is not carried out using deactivated 3,3'-diamino-4,4'-dimethyldiphenylurea a totally different result is obtained. On account of the very rapid preliminary reaction of the diaminodiphenylurea with the 4,4'-diisocyanatodiphenylmethane a polyurea is formed after only a few minutes which has the properties of an inert filler and is not incorporated into the PUR system. As a result the processing time of the reaction mixture is too short (rapid increase in viscosity). The solid product obtained under heat does not display any tenacity and breaks upon being subjected to tensile stress or pressure.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane urea elastomer from a heterogeneous mixture comprising
   (a) a diaminodiphenylurea corresponding to the formula

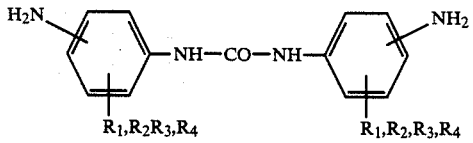

wherein $R_1$, $R_2$, $R_3$ and $R_4$, which may be the same or different, represent hydrogen or a $C_1$–$C_6$ alkyl radical and wherein the amino groups are in the meta and/or para position to the urea group and
   (b) an NCO-terminated prepolymer based on a polyisocyanate and a polyhydroxyl compound having a molecular weight of 400 to about 10,000,
   which comprises reacting the heterogeneous system to form a polyurethane urea elastomer by heating the mixture to a temperature of about 100 to 180 C.

2. The process of claim 1, wherein said polyhydroxyl compound is chosen such that said diaminodiphenylurea is only partially soluble in said polyhydroxyl compound at room temperature, but said diaminodiphenylurea is readily soluble in said polyhydroxyl compound at an elevated temperature below the melting point of said diaminodiphenylurea.

3. The process of claim 1, wherein said diaminodiphenylurea is admixed with said NCO-terminated prepolymer in the form of a suspension in a portion of said polyhydroxyl compound, the ratio by weight of said diaminodiphenylurea to said polyhydroxyl compound being about 1.0:0.5 to 1.0:5.0.

4. The process of claim 2, wherein said diaminodiphenylurea is admixed with said NCO-terminated prepolymer in the form of a suspension in at least a portion of said polyhydroxyl compound, the ratio by weight of said diaminodiphenylurea to said polyhydroxyl compound being about 1.0:1.0 to 1.0:2.0.

5. The process of claim 3, wherein about 0.05 to 20 $NH_2$ equivalents of said diaminodiphenylurea were reacted with a polyisocyanate in a preceeding step.

6. The process of claim 1, wherein said diaminodiphenylurea comprises a member selected from the group consisting of 3,3'-diamino-4,4'-dimethyldiphenylurea and 4,4'-diaminodiphenylurea.

7. The process of claim 3, wherein said diaminodiphenylurea comprises a member selected from the group consisting of 3,3'-diamino-4,4'-dimethyldiphenylurea and 4,4'-diaminodiphenylurea.

8. The process of claim 4, wherein said diaminodiphenylurea comprises a member selected from the group consisting of 3,3'-diamino-4,4'-dimethyldiphenylurea and 4,4'-diaminodiphenylurea.

9. The process of claim 5, wherein said diaminodiphenylurea comprises a member selected from the group consisting of 3,3'-diamino-4,4'-dimethyldiphenylurea and 4,4'-diaminodiphenylurea.

10. A heterogeneous reaction mixture which comprises a suspension of
    (a) a diaminodiphenylurea in solid form and corresponding to the formula

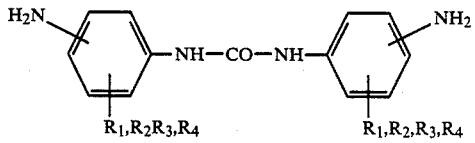

wherein $R_1$, $R_2$, $R_3$ and $R_4$, which may be the same or different, represent hydrogen or a $C_1$–$C_6$ alkyl radical and wherein the amino groups are in the meta and/or para position to the urea group and
    (b) an NCO-terminated prepolymer prepared from a polyisocyanate and a polyhydroxyl compound having a molecular weight of 400 to about 10,000.

11. The heterogeneous reaction mixture of claim 10, wherein said polyhydroxyl compound is chosen such that said diaminodiphenylurea is only partially soluble in said polyhydroxyl compound at room temperature, but said diaminodiphenylurea is readily soluble in said polyhydroxyl compound at an elevated temperature below the melting point of said diaminodiphenylurea.

12. The heterogeneous reaction mixture of claim 10, wherein said diaminodiphenylurea is admixed with said NCO-terminated prepolymer in the form of a suspension in a portion of said polyhydroxyl compound, the ratio by weight of said diaminodiphenylurea to said polyhydroxyl compound being about 1.0:0.5 to 1.0:5.0.

13. The heterogeneous reaction mixture of claim 11, wherein said diaminodiphenylurea is admixed with said NCO-terminated prepolymer in the form of a suspension in at least a portion of said polyhydroxyl compound, the ratio by weight of said diaminodiphenylurea to said polyhydroxyl compound being about 1.0:1.0 to 1.0:2.0.

14. The heterogeneous reaction mixture of claim 12, wherein about 0.05 to 20 $NH_2$ equivalents of said diaminodiphenylurea were reacted with a polyisocyanate in a preceeding step.

15. The heterogeneous reaction mixture of claim 10, wherein said diaminodiphenylurea comprises a member selected from the group consisting of 3,3'-diamino-4,4'-dimethyldiphenylurea and 4,4'-diaminodiphenylurea.

16. The heterogeneous reaction mixture of claim 12, wherein said diaminodiphenylurea comprises a member selected from the group consisting of 3,3'-diamino-4,4'-dimethyldiphenylurea and 4,4'-diaminodiphenylurea.

17. The heterogeneous reaction mixture of claim 13, wherein said diaminodiphenylurea comprises a member selected from the group consisting of 3,3'-diamino-4,4'-dimethyldiphenylurea and 4,4'-diaminodiphenylurea.

18. The heterogeneous reaction mixture of claim 14, wherein said diaminodiphenylurea comprises a member selected from the group consisting of 3,3'-diamino-4,4'-dimethyldiphenylurea and 4,4'-diaminodiphenylurea.

* * * * *